United States Patent
Brolin

(10) Patent No.: US 8,611,212 B2
(45) Date of Patent: Dec. 17, 2013

(54) METHOD AND SYSTEM FOR WRITING TO A VLAN TAG

(75) Inventor: Stephen J. Brolin, Livingston, NJ (US)

(73) Assignee: Fujitsu Limited, Kawasaki-shi (JP)

( * ) Notice: Subject to any disclaimer, the term of this patent is extended or adjusted under 35 U.S.C. 154(b) by 257 days.

(21) Appl. No.: 13/076,070

(22) Filed: Mar. 30, 2011

(65) Prior Publication Data

US 2012/0250505 A1 Oct. 4, 2012

(51) Int. Cl.
*H04L 12/12* (2006.01)
(52) U.S. Cl.
USPC .......................................... 370/229; 370/230
(58) Field of Classification Search
USPC ............................................ 370/395.53, 392
See application file for complete search history.

(56) References Cited

U.S. PATENT DOCUMENTS

| | | | | |
|---|---|---|---|---|
| 7,580,409 | B1 * | 8/2009 | Swenson et al. | 370/392 |
| 2004/0170176 | A1 * | 9/2004 | Kadambi et al. | 370/392 |
| 2006/0291378 | A1 | 12/2006 | Brotherston et al. | |
| 2009/0073988 | A1 | 3/2009 | Ghodrat et al. | |
| 2010/0220724 | A1 | 9/2010 | Rabie et al. | |
| 2010/0306489 | A1 | 12/2010 | Abts et al. | |
| 2011/0051723 | A1 | 3/2011 | Rabie et al. | |

OTHER PUBLICATIONS

Wikipedia entry for IEEE 802.1Q (Downloaded from http://web.archive.org/web/20100213010256/http://en.wikipedia.org/wiki/IEEE_802.1Q on Feb. 19, 2013), p. 2.*
LAN/MAN Standards Committee of the IEEE Computer Society, Aug. 17, 2005, IEEE P802.1ad/D6.0 (Virtual Bridged Local Area Networks—Amendment 4: Provider Bridges), p. 29, Section 9.7; p. 28, Section 9.6.*
United States Office Action; U.S. Appl. No. 13/076,009; pp. 23, Aug. 16, 2013.
United States Final Office Action; U.S. Appl. No. 13/076,097; pp. 21, Oct. 9, 2013.
United States Office Action; U.S. Appl. No. 13/076,119; pp. 16, Sep. 13, 2013.

* cited by examiner

*Primary Examiner* — Andrew Chriss
*Assistant Examiner* — Jose Perez
(74) *Attorney, Agent, or Firm* — Baker Botts L.L.P.

(57) ABSTRACT

According to one embodiment, a method may include writing a congestion forward indicator (CFI) bit of an outer virtual local area network (VLAN) tag in an Ethernet frame to one of a first setting or a second setting, reading the CFI bit of the outer VLAN tag at a switching element, copying priority (PRI) bits of the outer VLAN tag to PRI bits of an inner VLAN tag if the CFI bit of the outer VLAN tag is set to the first setting, and maintaining the state of the PRI bits of the inner VLAN tag if the CFI bit of the outer VLAN tag is set to the second setting.

15 Claims, 4 Drawing Sheets

METHOD AND SYSTEM FOR WRITING TO A VLAN TAG

TECHNICAL FIELD OF THE DISCLOSURE

The present disclosure relates generally to networked communications and, more particularly, to a method and system for writing to a VLAN tag.

BACKGROUND

A communication network may include network elements that route packets and/or frames through the network. In some network elements, frame processing may be distributed among several subsystems of the network element (e.g., line cards, switches, and traffic managers). In some instances, a network element used in a communication network may be a multi-function Ethernet aggregation network element. A multi-function Ethernet aggregation network element may be one which supports many functions, including without limitation link aggregation, virtual LAN (VLAN) detection, and traffic management and shaping.

A network element may include one or more plug-in units (PIUs). A PIU may comprise a modular electronic device that provides any suitable network communication functionality. For example, a PIU may include, among other things, a switch (e.g., an Ethernet switch) for switching traffic through the network element and a traffic manager for shaping and/or policing network flows.

SUMMARY

According to one embodiment, a method may include writing a congestion forward indicator (CFI) bit of an outer virtual local area network (VLAN) tag in an Ethernet frame to one of a first setting or a second setting, reading the CFI bit of the outer VLAN tag at a switching element, copying priority (PRI) bits of the outer VLAN tag to PRI bits of an inner VLAN tag if the CFI bit of the outer VLAN tag is set to the first setting, and maintaining the state of the PRI bits of the inner VLAN tag if the CFI bit of the outer VLAN tag is set to the second setting.

One or more other technical advantages of the disclosure may be readily apparent to one skilled in the art from the figures, descriptions, and claims included herein.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
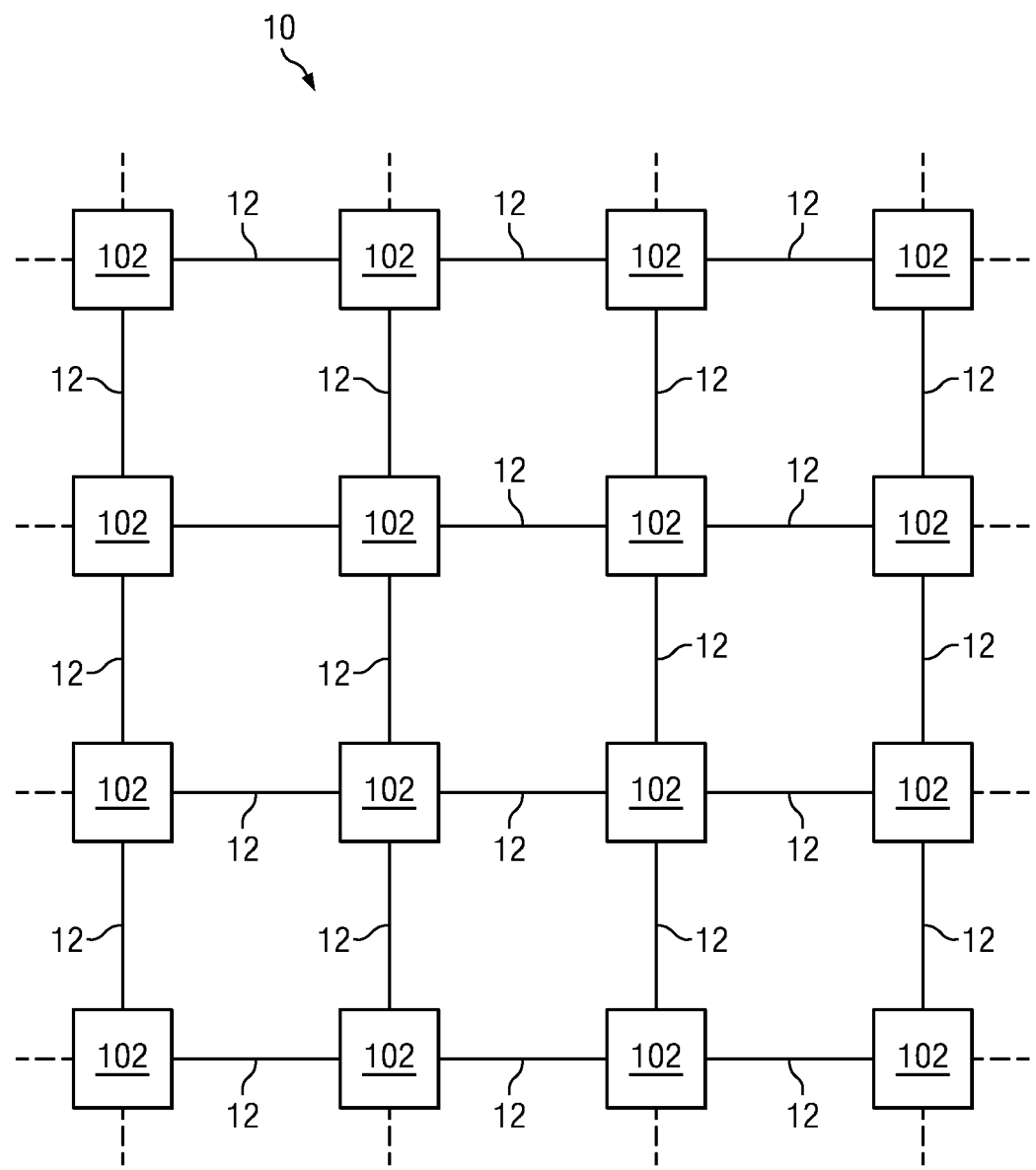
FIG. 1 illustrates a block diagram of an example communication network, in accordance with certain embodiments of the present disclosure.

FIG. 1 illustrates a block diagram of an example network 10, in accordance with certain embodiments of the present disclosure. Network 10 may include one or more transmission media 12 operable to transport one or more signals communicated by components of network 10. In certain embodiments, network 10 may carry Ethernet signals. The components of network 10, coupled together by transmission media 12, may include a plurality of network elements 102. In the illustrated network 10, each network element 102 is coupled to four other nodes. However, any suitable configuration of any suitable number of network elements 102 may create network 10. Although network 10 is shown as a mesh network, network 10 may also be configured as a ring network, a point-to-point network, or any other suitable network or combination of networks. Network 10 may be used in a short-haul metropolitan network, a long-haul inter-city network, or any other suitable network or combination of networks.

Each transmission medium 12 may include any system, device, or apparatus configured to communicatively couple network elements 102 to each other and communicate information between corresponding network elements 102. For example, a transmission medium 12 may include an optical fiber, an Ethernet cable, a Ti cable, a WiFi signal, a Bluetooth signal, or other suitable medium.

Network 10 may communicate information or "traffic" over transmission media 12. As used herein, "traffic" means information transmitted, stored, or sorted in network 10. Such traffic may comprise optical or electrical signals configured to encode audio, video, textual, and/or any other suitable data. The data may also be real-time or non-real-time. Traffic may be communicated via any suitable communications protocol, including, without limitation, the Ethernet communication protocol and the Internet Protocol (IP). Additionally, the traffic communicated in network 10 may be structured in any appropriate manner including, but not limited to, being structured in frames, packets, or an unstructured bit stream. As used herein, a "flow" may mean a sequence of packets, frames, cells, or any other segments of data communicated over a network.

Each network element 102 in network 10 may comprise any suitable system operable to transmit and receive traffic. In the illustrated embodiment, each network element 102 may be operable to transmit traffic directly to one or more other network elements 102 and receive traffic directly from the one or more other network elements 102. Network elements 102 will be discussed in more detail below with respect to FIG. 2.

Modifications, additions, or omissions may be made to network 10 without departing from the scope of the disclosure. The components and elements of network 10 described may be integrated or separated according to particular needs. Moreover, the operations of network 10 may be performed by more, fewer, or other components.

Figure 2:
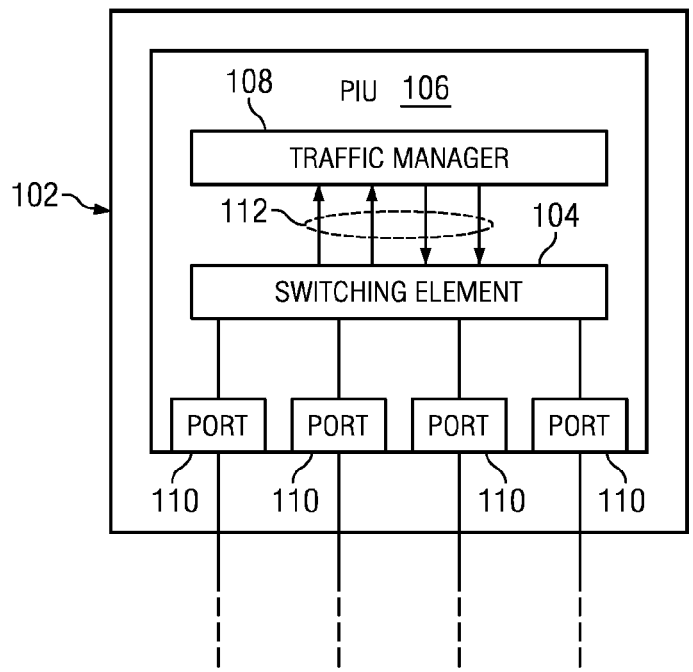
FIG. 2 illustrates a block diagram of an example network element, in accordance with certain embodiments of the present disclosure.

FIG. 2 illustrates a block diagram of certain embodiments of network element 102, in accordance with certain embodiments of the present disclosure. As discussed above, each network element 102 may be coupled to one or more other network elements 102 via one or more transmission media 12. Each network element 102 may generally be configured to receive data from and/or transmit data to one or more other network elements 102. In certain embodiments, network element 102 may comprise a switch configured to route data received by network element 102 to another device coupled to network element 102 (e.g., another network element 102 or one or more devices or clients coupled to the network element 102).

As depicted in FIG. 2, a network element 102 may include a plug-in unit (PIU) 106 with a plurality of ports 110. In some embodiments, ports 110 may be coupled to other components within network element 102. For example, an optical receiver in network element 102 may receive traffic in optical form from transmission line 12 and convert the traffic into electrical form, allowing the traffic to be communicated from the optical receiver to PIU 106 via port 110.

A port 110 may be communicatively coupled to a switching element 104 and may include any suitable system, apparatus, or device configured to serve as an interface between a switching element 104 and other devices within network element 102. A port 110 may be implemented using hardware, software, or any combination thereof. For example, a port 110 may comprise an Ethernet port or any other suitable port. Some of ports 110 may be interfaced to clients of a network provider (e.g., devices or networks, other than network elements 102, that are coupled to the network element 102), while other of ports 110 may be interfaced to the provider network (e.g., other network elements 102).

A PIU 106 may include any system, device, or apparatus having plug-in terminals so that some or all electrical connections of the PIU 106 can be made engaging the unit with a suitable socket of network element 102. A PIU may include any system, device, or apparatus or combination thereof to implement networking functions. As shown in FIG. 2, one example of a PIU 106 may include a switching element 104, a traffic manager 108, intra-PIU links 112, and a plurality of ports 110.

An intra-PIU link 112 may include any system, device, or apparatus configured to communicatively couple a switching element 104 to a traffic manager 108 and communicate information between a switching element 104 and its corresponding traffic manager 108. For example, an intra-PIU link 112 may include a metal wire, a printed wiring board path, or other suitable medium.

A traffic manager 108 may be communicatively coupled to switching element 104 on the same PIU 106 via intra-PIU links 112, and may include any suitable system, apparatus, or device configured to police and/or shape flows of traffic. Traffic shaping is the control of traffic flows in order to optimize or guarantee performance, improve latency, and/or increase usable bandwidth by delaying packets of traffic that meet certain criteria. More specifically, traffic shaping is any action on a flow of packets which manages the packets such that they conform to some predetermined constraint (e.g., a service-level agreement or traffic profile). Traffic policing is the process of monitoring network traffic for compliance with a service-level agreement and taking action to enforce such agreement. For example, in traffic policing, traffic exceeding a service-level agreement may be discarded immediately, marked as non-compliant, or left as-is, depending on an administrative policy and the characteristics of the excess traffic.

A switching element 104 may include any suitable system, apparatus, or device configured to receive ingress traffic via a port 110 and route such traffic to a particular egress port 110 based on analyzing the contents of the data (e.g., a destination address of a packet of traffic). For example, switching element 104 may comprise an Ethernet switch for switching Ethernet traffic through network element 102.

In a network element, the identity of a flow of traffic may depend on many factors. For example, flows may require unique labels as they travel through various logic engines in a switch. The label may identify the flow with sufficient resolution such that all frames of traffic with the same label undergo identical treatment in a logic engine. As an illustrative example, flows entering any one client port of a network element may each have a customer VLAN tags (also known as C-tags or inner VLAN tags) unique to flows entering that port. On ingress, each flow may be classified and processed per its inner VLAN tag, or a label traceable to such tag. Additionally, some flows may be stacked on ingress with an ingress connection identifier (iXid) tag, which may be unique to all flows entering all ports in the network element. At a traffic manager, the iXid tag may be replaced by an egress connection identifier (eXid) tag, which may be unique for each egress flow in the network element. Some flows may then require the eXid tag to be stripped on egress from the network element, and some of those flows may further require copying the priority (PRI) bits of the eXid tag to the PRI bits of the inner VLAN tag. The PRI copy function may be performed by classifying on the eXid tag of an Ethernet frame to determine whether or not to copy the PRI bits from the of the eXid tag to the inner VLAN tag. However, for a three-bit PRI marker having eight potential values, and for example two-thousand unique flows, sixteen thousand rules would be required for the PRI copy feature. Accordingly, a more efficient means by which to classify on a large number of unique flows upon egress from a network element may be desired.

Figure 3:
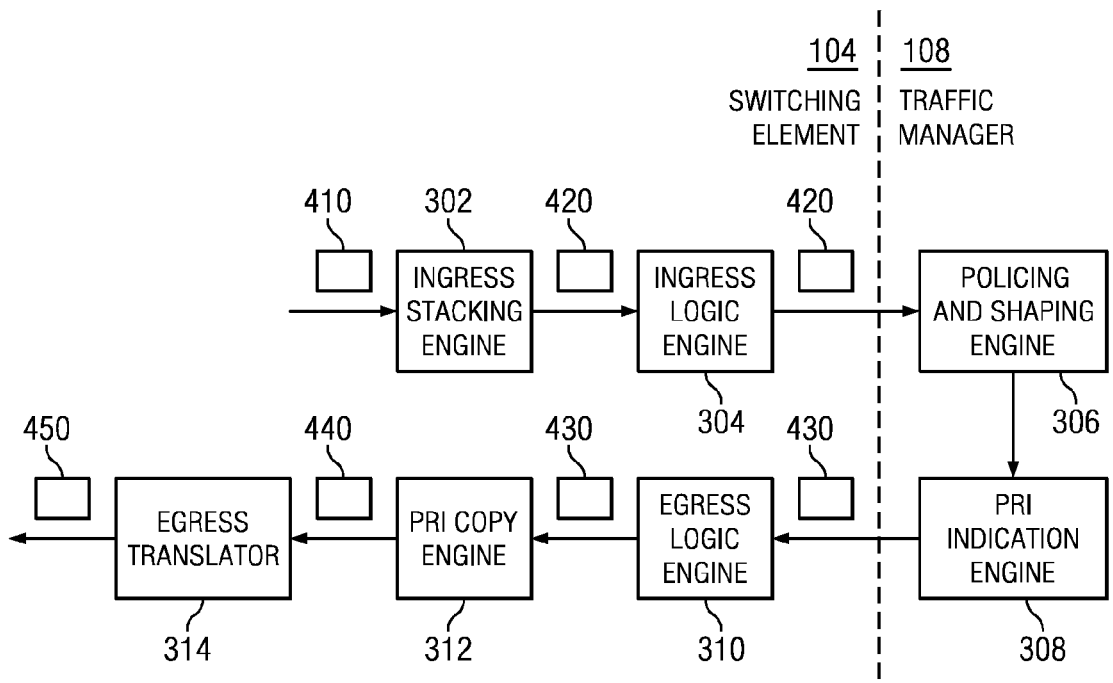
FIG. 3 illustrates a block diagram depicting an example implementation of a PRI copy indicator, in accordance with certain embodiments of the present disclosure.

FIG. 3 illustrates a block diagram depicting an example implementation of a PRI copy indication performed in PIU 106, in accordance with certain embodiments of the present disclosure. In some embodiments, the functional blocks illustrated in FIG. 3 may be implemented partially or fully in software or firmware. Switching element 104 and traffic manager 108 may include processors and/or other integrated circuits that may be configured to execute such software or firmware.

Figure 4:
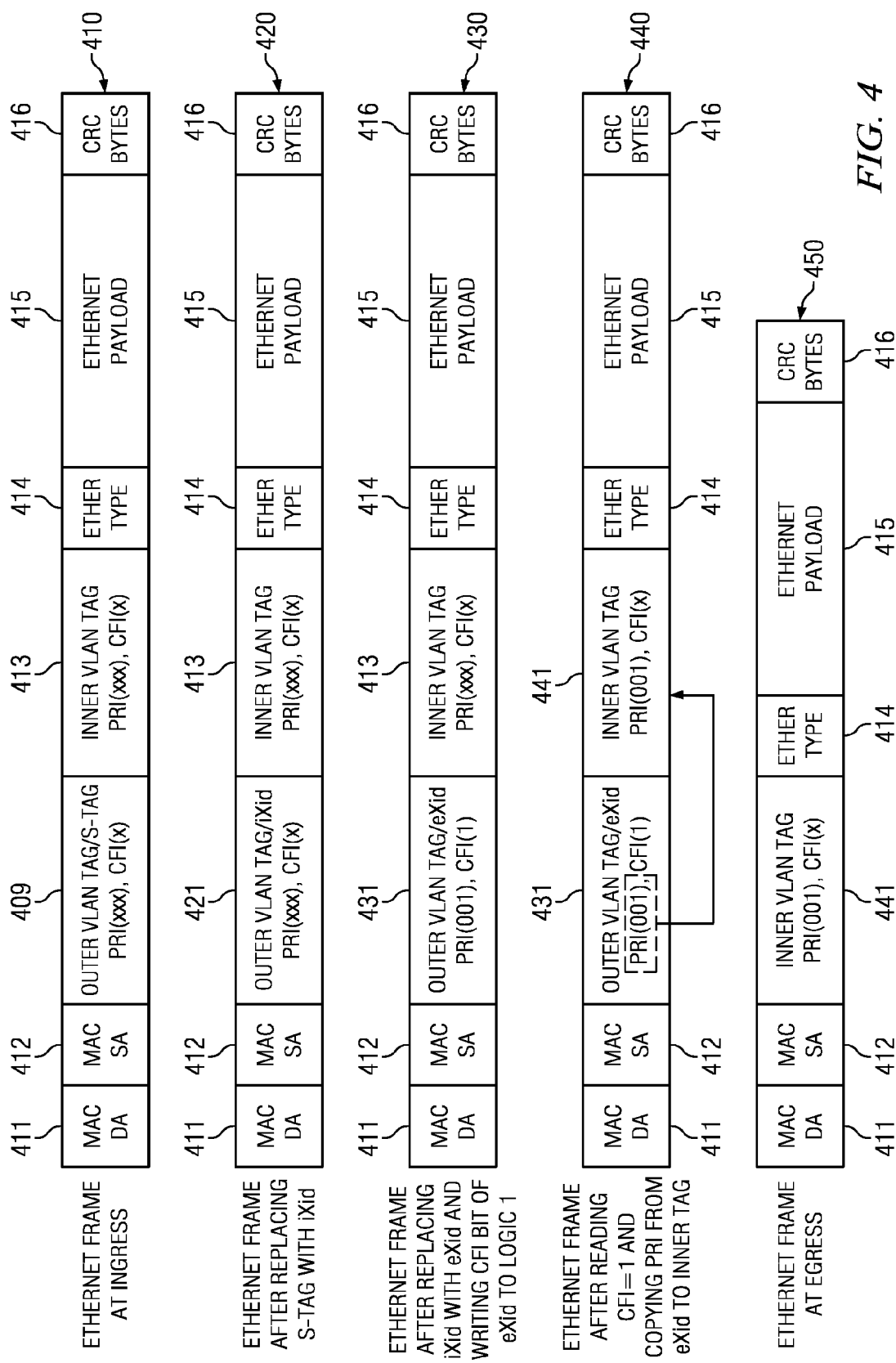
FIG. 4 illustrates an Ethernet frame having the CFI bit in the outer VLAN tag utilized as a PRI copy indicator, in accordance with certain embodiments of the present disclosure.

FIG. 4 illustrates an Ethernet frame having the CFI bit in the outer VLAN tag utilized as a PRI copy indicator, in accordance with certain embodiments of the present disclosure. Each of FIGS. 3 and 4 contemplates the writing of a PRI copy indicator for flows in which an egress connection identifier (eXid) tag, also referred to generically as an outer VLAN tag, is stripped upon egress.

In the example depicted in FIGS. 3 and 4, an Ethernet frame 410 may enter a switching element 102 via a port 110. As shown in FIG. 4, an Ethernet frame 410 that ingresses network element 102 from elsewhere on the network may include service virtual local area network (VLAN) tag 409, also referred to as an S-tag or generically referred to as an outer VLAN tag. In general, S-tags may be useful for service providers to use these VLAN tags internally to their network, while mixing traffic from client flows that already have an inner VLAN tag. S-tag 409 may include among other fields a three-bit priority (PRI) marker and a one-bit congestion forward indicator (CFI). The PRI marker may indicate the level of priority the particular flow has in the network, and the CFI bit may indicate whether the flow has exceeded its contract service performance, making its frames candidates to be dropped in the case of excess congestion. Ethernet frame 410 may also include among other fields destination MAC address (MAC DA) 411, source MAC address (MAC SA) 412, ethertype field 414 indicating the type of Ethernet payload in Ethernet frame 410, Ethernet payload 415, cyclic redundancy check bytes (CRC bytes) 416 for detecting an error, and an inner VLAN tag 413. Inner VLAN tag 413 may be client specific and accordingly may also be referred to as a client VLAN tag or a C-tag. While the CFI marker in the S-tag or other outer VLAN tag may be used as a congestion marker by the network, the CFI marker on the inner VLAN tag may be reserved for client use.

Ingress stacking engine 302 depicted in FIG. 3 may receive Ethernet frame 410, replace S-tag 409 with iXid tag 421, and output Ethernet frame 420. iXid tag 421 may also be referred to generically as the outer VLAN tag. iXid tag 421 may be unique among all ingress flows and independent from the ingress and/or egress port 110 of the Ethernet frame 420. In some alternative embodiments in which the Ethernet frame is ingressed from a client, the Ethernet frame may not include an S-tag on ingress. When the ingressing Ethernet frame does not include an S-tag, ingress stacking engine 302 may add iXid tag 421 to the Ethernet frame.

Switching element 104 may use iXid tags to classify all ingress flows through ingress logic engine 304 of switching element 104. For example, ingress logic engine 304 may perform a mapping of the PRI bits and the CFI bit inside iXid tag 421 of Ethernet frame 420 to an internal class-of-service (COS) marker and an internal congestion (CNG) marker based on an ingress profile derived from iXid tag 421. Switching element 104 may then communicate the Ethernet frame 420, including iXid tag 421, to traffic manager 108. Switching element 104 may also communicate the COS marker and the CNG marker to traffic manager 108.

Policing and shaping engine 306 of traffic manager 108 may receive Ethernet frame 420 and replace iXid tag 421 in Ethernet frame 420 with egress connection identifier (eXid) tag 431 as illustrated in Ethernet frame 430. eXid tag 431 may occupy the same position in Ethernet frame 430 as iXid tag 421 occupied in Ethernet frame 420, and thus eXid tag 431 may also be generically referred to as the outer VLAN tag. eXid tag 431 may be unique among all egress flows and independent from the ingress and/or egress port 110 of the frame. In some alternative embodiments, however, some flows may be treated in the aggregate and eXid tag 431 for some flows may be non-unique. Policing and shaping engine 306 of traffic manager 108 may also perform policing and shaping based on at least eXid tag 431. In some alternative embodiments, policing and shaping engine 306 may police Ethernet frame 420 based at least on iXid tag 421 before iXid tag 421 is replaced by eXid tag 431.

The PRI indication engine 308 may determine whether eXid tag 431 will be dropped for particular flows at egress from switching element 104 and whether a PRI copy is desired before eXid tag 431 is dropped based indexing a register with the eXid tags of the flows. PRI indication engine 308 of traffic manager 108 may have an egress register stack containing instructions for PRI indication engine 308 to handle the CFI bit of eXid tag 431 (or other outer VLAN tag) in one of three ways based on indexing the register, whose contents are populated by a central processing unit, with the eXid tag of a flow. First, for flows in which eXid tag 431 or other outer VLAN tag may be retained upon egress from switching element 104, the CFI bit in eXid tag 431 or other outer VLAN tag must reflect its original purpose as a congestion marker. For such flows, PRI indication engine 308 may transparently transmit the CFI bit of eXid tag 431 to switching element 104 without modification. Second, for flows in which eXid tag 431 may be dropped upon egress from switching element 104, but where no PRI copy is desired, PRI indication engine 308 may set the CFI bit of eXid tag 431 to logical 0. Third, for flows in which eXid tag 431 may be dropped upon egress from switching element 104, and where a PRI copy is desired, PRI indication engine 308 may set the CFI bit of eXid tag 431 to logical 1, as illustrated by Ethernet frame 430. In some alternative embodiments, a setting of logical 0 for the CFI bit in eXid tag (or other outer VLAN tag) may instruct that a PRI copy is to be performed while a setting of logical 1 for the CFI bit in eXid tag (or other outer VLAN tag) may instruct that no PRI copy is to be performed.

FIGS. 3 and 4 both contemplate a particular flow for which eXid tag 431 may be dropped upon egress from switching element 104 and a PRI copy is desired. Though the system and the steps of the method are described in this disclosure with reference to FIGS. 3 and 4 in the context of an Ethernet frame having eXid tag 431, some alternative embodiments may include the use of any type of outer VLAN tag including a CFI bit, or any other bit not otherwise used in the egress direction, whereby the outer VLAN tag is to be stripped upon egress from network element 102. Because eXid tag 431 in Ethernet frame 430 will be stripped upon egress from switching element 104, the CFI bit in eXid tag 431 has no use once the Ethernet frame 450 egresses switching element 102. Accordingly, the CFI bit in eXid tag 431 may be appropriated by PRI indication engine 308 and written to as a class bit signaling whether or not to copy the PRI bits of eXid tag 431 to the PRI bits of inner VLAN tag 413 upon egress from switching element 104.

After writing to the CFI bit in eXid tag 431, traffic manager 108 may communicate the Ethernet frame 430 to switching element 104 as shown in FIG. 3. Certain markers, such as the internal COS and CNG markers may also be communicated to switching element 104. eXid tag 431 may be used by the egress logic engine 310 to classify all egress flows through the egress logic engine 310 of switching element 104. While certain markers, such as the COS marker and the CNG marker may be communicated to egress logic engine 310 of switching element 104, those markers not internal to Ethernet frame 430 may not reach PRI copy engine 312 of switching element 104. Accordingly, while certain markers may instruct actions to be taken within egress logic engine 310, those markers may be unable to instruct actions to be taken at PRI copy engine 312. On the other hand, the CFI bit of eXid tag 431 will reach the PRI copy engine and is accordingly capable of instructing actions at PRI copy engine 312.

PRI copy engine 312 may receive Ethernet frame 430, read the CFI bit in eXid tag 431, and determine whether or not to perform a PRI copy from the eXid tag 431 to inner VLAN tag 413. A reading of logical 1 for the CFI bit of the eXid tag 431 may instruct switching element 104 to copy the three PRI bits in the eXid tag 431 to the three PRI bits in inner VLAN tag 413 and outputting Ethernet frame 440 with inner VLAN tag 441. On the other hand, a reading of logical 0 would have instructed the switching element 104 not to copy the three PRI bits in the eXid tag 431 to the three PRI bits in the inner VLAN tag, and rather to maintain the state of the three PRI bits in the inner VLAN tag 413. Subsequently, the eXid tag 431 may be dropped from the Ethernet frame 440 at egress translator 314 and Ethernet frame 450 may be egressed from switching element 104.

Utilizing the CFI bit of eXid tag 431 as a class bit may have the advantage of saving a large number of rules required by switching element 104 to perform the PRI copy function. For example, to handle two-thousand unique flows in traditional systems, each flow with eight potential PRI values, switching element 104 would require sixteen-thousand rules to implement the PRI copy function. However, by utilizing the CFI bit in eXid tag 431 as a class bit, switching element 104 may only require a total of nine rules to implement the PRI copy function for a large number of flows (e.g., two thousand or more unique flows). Switching element 104 may require eight rules corresponding to the eight potential PRI values if the CFI bit indicates a PRI copy, and one rule if the CFI bit indicates no copy. Accordingly, the amount of memory utilized by switching element 104 to implement the PRI copy function may be minimized by use of the CFI bit of eXid tag 431 as a class bit for the PRI copy function.

Figure 5:
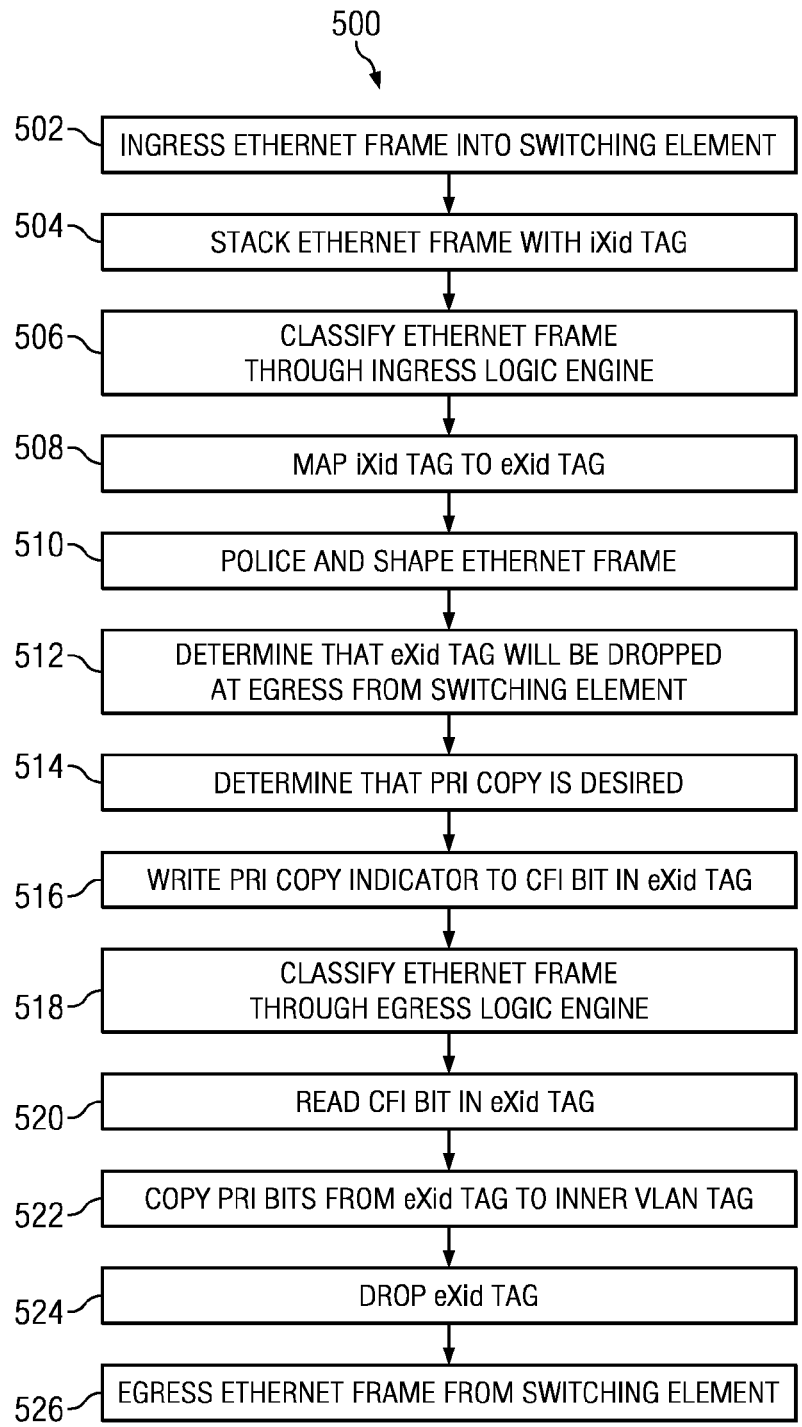
FIG. 5 illustrates a flow chart depicting an example method for performing a PRI copy upon egress.

FIG. 5 depicts a flow chart of an example method 500 for copying the PRI bits of an eXid tag to an inner VLAN tag.

At step 502, Ethernet frame 410 may enter switching element 104 via a port 110. Ethernet frame 410 may include S-tag 409. S-tag 409 may include among other fields a PRI marker and a one-bit CFI marker.

At step 504, switching element 104 or another component of network element 102 may stack Ethernet frame 410 with iXid tag 421, which may be unique among all flows handled by network element 102 and independent from the ingress and/or egress port 110 of Ethernet frame 410.

At step 506, switching element 104 may classify Ethernet frame 420 through ingress logic engine 304. For example, ingress logic engine 304 of switching element 104 may map the three-bit PRI marker and the one-bit CFI marker in iXid tag 421 to a three-bit COS marker and a one-bit CNG marker based on an ingress profile derived from iXid tag 421.

At step 508, traffic manager 108 may map iXid tag 421 to eXid tag 431. eXid tag 431 may occupy the same position in Ethernet frame 430 as iXid tag 421 occupied in Ethernet frame 420. eXid tag 431 may be unique among all egress flows and independent from the ingress and/or egress port 110 of the frame.

At step 510, traffic manager 108 may police and shape Ethernet frame 430 based at least on eXid tag 431. In some alternative embodiments, traffic manager 108 may police Ethernet frame 420 based at least on iXid tag 421 before iXid tag 421 is replaced by eXid tag 431.

At step 512, traffic manager may determine that eXid tag will be dropped at egress from switching element 104 based on indexing a register with eXid tag 431 of Ethernet frame 430. At step 514, traffic manager 108 may also determine that a PRI copy is desired based on indexing a register with eXid tag 431 of Ethernet frame 420. At step 516, traffic manager 108 may write the PRI copy indicator to the CFI bit in eXid tag 431.

At step 518, switching element 104 may classify Ethernet frame 430 through the egress logic engine 310. In some embodiments, the eXid tag 431 may be used by the egress logic engine 310 to classify all egress flows through the egress logic engine 310 of switching element 104.

At step 520, switching element 104 may read the CFI bit in eXid tag 431. A reading of logical 1 for the CFI bit of the eXid tag 431 may instruct switching element 104 proceed to step 522 where the switching element 104 may copy the PRI bits in eXid tag 431 to the PRI bits in inner VLAN tag 413, thus generating Ethernet frame 440 with inner VLAN tag 441.

At step 524, switching element 104 may drop eXid tag 431 from Ethernet frame 440, and egress Ethernet frame 450 from the switching element 104 at step 526.

Although FIG. 5 discloses a particular number of steps to be taken with respect to method 500, method 500 may be executed with greater or lesser steps than those depicted in FIG. 5. In addition, although FIG. 5 discloses a certain order of steps to be taken with respect to method 500, the steps comprising method 500 may be completed in any suitable order.

A component of network 10 may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. For example, logic may perform the functions of the ingress stacking engine 302, the ingress logic engine 304, the egress logic engine 310, the PRI copy engine 312, and the egress translator 314 in switching element 104, as well as the functions of the policing and shaping engine 306 and the PRI indication engine 308 in traffic manager 108. Logic may include hardware, software, and/or other logic. Logic may be encoded in one or more tangible computer readable storage media and may perform operations when executed by a computer. Certain logic, such as a processor, may manage the operation of a component. Examples of a processor include one or more computers, one or more microprocessors, one or more applications, and/or other logic.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to network 10 without departing from the scope of the invention. The components of network 10 may be integrated or separated. Moreover, the operations of network 10 may be performed by more, fewer, or other components. Additionally, operations of network 10 may be performed using any suitable logic. As used in this document, "each" refers to each member of a set or each member of a subset of a set.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method comprising:
    writing a congestion forward indicator (CFI) bit of an outer virtual local area network (VLAN) tag in an Ethernet frame to one of a first setting or a second setting;
    reading the CFI bit of the outer VLAN tag at a switching element;
    copying priority (PRI) bits of the outer VLAN tag to PRI bits of an inner VLAN tag if the CFI bit of the outer VLAN tag is set to the first setting; and
    maintaining the state of the PRI bits of the inner VLAN tag if the CFI bit of the outer VLAN tag is set to the second setting.

2. A method according to claim 1, further comprising:
    receiving the Ethernet frame at the switching element via an ingress port, the outer VLAN tag of the received Ethernet frame comprising a service VLAN tag (S-tag);
    replacing the S-tag with an outer VLAN tag comprising an ingress connection identifier (iXid) tag at the switching element; and
    replacing the iXid tag with an outer VLAN tag comprising an egress connection identifier (eXid) tag at a traffic manager, wherein the writing of the CFI bit is performed on the eXid tag and the PRI bits are copied from the eXid tag.

3. A method according to claim 2, further comprising policing and shaping the Ethernet frame at the traffic manager.

4. A method according to claim 3, further comprising determining at the traffic manager that the eXid tag of the Ethernet frame will be dropped from the Ethernet frame at egress from the switching element.

5. A method according to claim 1, further comprising dropping the outer VLAN tag from the Ethernet frame at egress from the switching element.

6. A network element comprising:
a traffic manager configured to write a congestion forward indicator (CFI) bit of an outer virtual local area network (VLAN) tag in an Ethernet frame to one of a first setting or a second setting; and
a switching element configured to:
read the CFI bit of the outer VLAN tag;
copy priority (PRI) bits of the outer VLAN tag to PRI bits of an inner VLAN tag if the CFI bit of the outer VLAN tag is set to the first setting; and
maintain the state of the PRI bits of the inner VLAN tag if the CFI bit of the outer VLAN tag is set to the second setting.

7. A network element according to claim 6, wherein:
the switching element is further configured to:
receive the Ethernet frame via an ingress port, the outer VLAN tag of the received Ethernet frame comprising a service VLAN tag (S-tag); and
replace the S-tag with an outer VLAN tag comprising an ingress connection identifier (iXid) tag; and
the traffic manager is further configured to replace the iXid tag with an outer VLAN tag comprising an egress connection identifier (eXid) tag, wherein the writing of the CFI bit is performed on the eXid tag and the PRI bits are copied from the eXid tag.

8. A network element according to claim 7, wherein the traffic manager is further configured to police and shape the Ethernet frame.

9. A network element according to claim 8, wherein the traffic manager is further configured to determine that the eXid tag of the Ethernet frame will be dropped from the Ethernet frame at egress from the switching element.

10. A network element according to claim 6, wherein the switching element is further configured to drop the outer VLAN tag from the Ethernet frame at egress from the switching element.

11. One or more non-transitory computer readable media storing logic that is operable, when executed, to:
write a congestion forward indicator (CFI) bit of an outer virtual local area network (VLAN) tag in an Ethernet frame to one of a first setting or a second setting;
read the CFI bit of the outer VLAN tag at a switching element;
copy priority (PRI) bits of the outer VLAN tag to PRI bits of an inner VLAN tag if the CFI bit of the outer VLAN tag is set to the first setting; and
maintain the state of the PRI bits of the inner VLAN tag if the CFI bit of the outer VLAN tag is set to the second setting.

12. The non-transitory computer readable media of claim 11, the logic further operable, when executed, to:
receive the Ethernet frame at the switching element via an ingress port, the outer VLAN tag of the received Ethernet frame comprising a service VLAN tag (S-tag);
replacing the S-tag with an outer VLAN tag comprising an ingress connection identifier (iXid) tag at the switching element; and
replace the iXid tag with an outer VLAN tag comprising an egress connection identifier (eXid) tag at a traffic manager, wherein the writing of the CFI bit is performed on the eXid tag and the PRI bits are copied from the eXid tag.

13. The non-transitory computer readable media of claim 12, the logic further operable, when executed, to police and shape the Ethernet frame at the traffic manager.

14. The non-transitory computer readable media of claim 12, the logic further operable, when executed, to determine at the traffic manager that the eXid tag of the Ethernet frame will be dropped from the Ethernet frame at egress from the switching element.

15. The non-transitory computer readable media of claim 12, the logic further operable, when executed, to drop the eXid tag from the Ethernet frame at egress from the switching element.

* * * * *